UNITED STATES PATENT OFFICE.

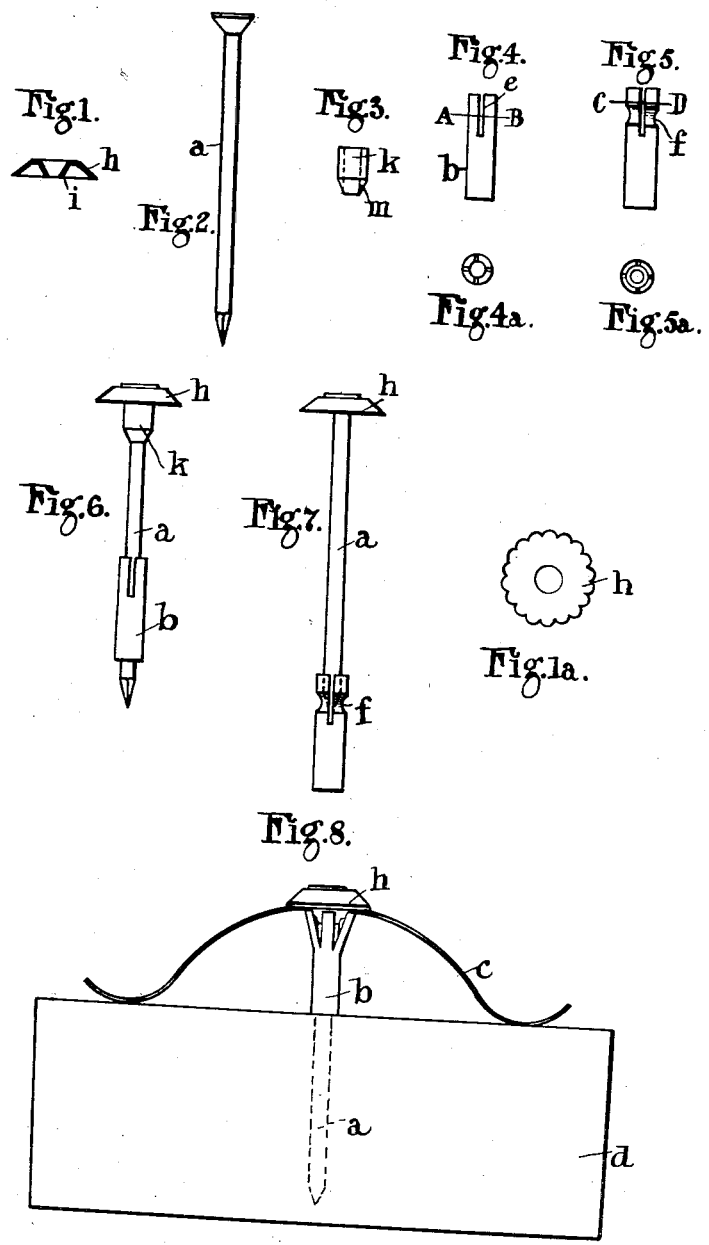

JOHN MITCHELL, OF PONSONBY, NEW ZEALAND, AND JOHN GELL, OF LONDON, ENGLAND.

MEANS FOR SECURING GALVANIZED-IRON SHEETS AND FOR ANALOGOUS PURPOSES.

1,108,209.

Specification of Letters Patent. Patented Aug. 25, 1914.

Application filed May 20, 1913. Serial No. 768,886.

*To all whom it may concern:*

Be it known that we, JOHN MITCHELL, of Arthur street, Ponsonby, Auckland, New Zealand, architect, and JOHN GELL, of 123 Upper Tollington Park, London, N., England, electrical engineer, both subjects of the King of Great Britain and Ireland, have invented certain new and useful Improvements Relating to Means for Securing Galvanized-Iron Sheets and for Analogous Purposes, of which the following is a specification.

This invention relates to the means employed for securing in position corrugated sheets of galvanized iron for roofs and other structures and for a variety of other analogous purposes and has for its object to provide an improved fastening whereby an effective water-tight joint is obtained at the fastening and the liability to denting which is experienced with ordinary nails is avoided.

The invention comprises the combination with a suitably headed nail (or screw) of a bush which can be inserted through the nail aperture before the nail is driven, and which, in the process of driving the nail, expands and by providing a support between the underside of the sheet and the purlin or the like to which the sheet is secured permits the nail to be driven tightly home without fear of denting and also enables a tight joint to be produced beneath the head of the nail.

The invention further comprises the formation with a washer placed beneath the head of the nail, of a tapered central sleeve which fits over the nail stem, and retains the washer in correct position relatively to the nail stem and head, the said sleeve in some cases also serving to expand the bush when the nail is driven home.

The invention also comprises the nails, screws and fittings therefor hereinafter described or indicated.

Referring to the accompanying drawings: Figures 1 to 5ª show various details and modifications for the complete assemblage. Fig. 1 shows a form of washer suitable for association with the head of a nail. Fig. 1ª showing a plan of a similar washer with a scalloped edge; Fig. 2 shows a convenient form of nail; Fig. 3 shows a form of tapered sleeve; Fig. 4 shows an elevation of a form of expansible bush, Fig. 4ª being a cross-section on the line A—B of Fig. 4. Fig. 5 shows a modified form of expansible bush having a circumferential construction. Fig. 5ª being a cross-section on the line C—D of Fig. 5; Fig. 6 shows a nail according to one form ready to drive. Fig. 7 showing a modification, while Fig. 8 shows a nail in place with its bush expanded.

In one convenient manner of carrying the invention into effect, an ordinary round wire nail, such as $a$ (Fig. 2) formed with a suitable head at one end, is employed. The pointed extremity of the nail may or may not be reduced in diameter for a sufficient length to enter the supporting bush. The bush, $b$ (Fig. 4) preferably comprises a portion of brass or other metal tube of a length which is a little less than the distance between the crown of a corrugation in the sheet $c$, and the purlin, $d$, (Fig. 8) or other timber to which the sheet is secured. For a suitable distance from one extremity the bush is formed with a number of longitudinal slits, $e$. The diameter of the bush is such that it will enter a slightly enlarged nail aperture in the sheet.

According to a modified form, the bush may be provided with a circumferential constriction, $f$ (see Fig. 5). To secure the sheet in position a bush in place on the nail as in Fig. 7, is inserted through the nail aperture, in the crown of a corrugation in the sheet and the nail is driven home through the bush into the purlin in the ordinary manner. The first effect of the nail is to expand the slit end of the bush so that it splays or spreads out beneath the underside of the crown of the corrugation in the sheet. Continued driving of the nail forces it through the bush into the timber beneath. When the head of the nail reaches the sheet the latter is supported by the extended arms of the bush beneath, as seen in Fig. 8, and in consequence the nail can be driven tightly home without denting the sheet. A tight joint is thus obtained. A washer such as $h$, Fig. 1, having a central sleeve or inturned portion such as $i$, is provided to coöperate with the head of the nail, and the joint may be rendered more effective by frilling or scalloping the edge of this washer as seen in Fig. 1ª beneath the head of the nail or by using a washer of soft metal so that the washer can spread and adapt itself readily to the contour of the corrugation in the sheet. The edge of the washer can be made slightly flatter than the central portion for a like object. The inturned sleeve *i*, serves to preserve the correct relationship between the washer and head and stem of the nail and prevent that tilting or dislocation of the washer which frequently occurs during manufacture when the washer consists only of a plain disk having a central aperture through which the nail is inserted. The sleeve may be formed integrally with the washer by pressing up at one side a portion of the metal around the aperture as seen in Fig. 1, or it may be made as a separate member, *k*, as seen in Fig. 3. A further useful result is obtained from the sleeve inasmuch as by making it with a tapered lower part, *m*, (see Fig. 3) it can enter the hole in the sheet and fill the hole and produces a tight joint there. Also the sleeve may be adapted to enter the bush if of the form shown in Fig. 5, and produce an additional expansion thereof beneath the sheet, or if the bush is of the form shown in Fig. 4, (see also Fig. 6), the sleeve serves as the sole means of expanding the bush. It will be understood that a sleeve such as *k*, is very conveniently used in conjunction with the integral sleeve *i* the former being slipped into position and securel in place by galvanizing. A bush as above described is employed with each nail.

The invention is also not limited in its application for securing corrugated sheets as it may be employed for securing other sheets and for a variety of similar purposes in which support is required on the opposite side of the sheet or like article to that from which the nail is driven.

The nail may have a part of less diameter at its lower end to pass through the constriction, *f*, the only essential being that the bush should be capable of expansion under the action of the nail when in position behind the sheet or the like, but the use of a nail with a reduced end which can be gripped by the bush is advantageous in the process of placing the bush in position and driving the nail therethrough. For some purposes also the washer beneath the head may be dispensed with, and an undercut or solid head may be adapted to provide the required joint between it and the sheet. In the latter case a thickened tapered portion may be formed beneath the head for producing extra expansion of the bush.

Various forms of bushes may be employed, for example, they may be produced with a bore of uniform diameter as described, or the bore at one end may be smaller than at the other to provide for the gripping of a reduced end of the nail. Further, the end of the bush which is slit may be made to a tapered configuration by pressing together the parts between the slits. It will be understood that instead of a nail, a screw nail may be used.

It will be seen that as regards the details of the invention many departures may be made from the precise forms described by way of example the essential features being a bush which will splay out during the action of inserting the nail or the like with the objects set forth above.

Having now described our invention, what we claim is new and desire to secure by Letters Patent is:—

1. In means for fastening metal sheets, or the like, the combination of a metal sheet having a nail aperture, a support spaced therefrom, a nail adapted to be driven through said aperture into said support to secure the sheet thereto, and a bush insertible through the sheet aperture to a position intermediate the sheet and support and having means to engage and brace the sheet at its inner side.

2. In means for fastening metal sheets, or the like, the combination of a metal sheet having a nail aperture, a support spaced therefrom, a nail adapted to be driven through said aperture into said support to secure the sheet thereto, and a bush insertible through the sheet aperture and including expansible members to engage the inner side of the sheet to brace the former against pounding stresses due to driving the nail home in said support.

3. In means for fastening metal sheets, or the like, the combination of a metal sheet having a nail aperture, a support spaced therefrom, a nail adapted to be driven through said aperture into said support to secure the sheet thereto, and a bush intermediate the sheet and support to brace the former against pounding stresses due to driving the nail home in said support, and means on the nail to expand the bush beneath the sheet.

4. In means for fastening metal sheets, or the like, the combination of a metal sheet having a nail aperture, a support spaced therefrom, a nail adapted to be driven through said aperture into said support to secure the sheet thereto, and means insertible through the nail aperture to assume a position intermediate the sheet and support and engage and brace the sheet on its inner side.

5. In means for fastening metal sheets, or the like, the combination of a metal sheet having a nail aperture, a support spaced therefrom, a nail adapted to be driven through said aperture into said support to secure the sheet thereto, and a bush insertible through the sheet aperture and slitted at one end for expansion intermediate the sheet and support to brace the former against pounding stresses due to driving the nail home in said support, and means on the nail to expand said bush.

6. In means for fastening metal sheets, or the like, the combination of a metal sheet having a nail aperture, a support spaced therefrom, a nail adapted to be driven through said aperture into said support to secure the sheet thereto, and a bush insertible through the sheet aperture and slitted at one end for expansion intermediate the sheet and support to brace the former against pounding stresses due to driving the nail home in said support, and a washer on the nail to expand said bush.

7. In means for fastening metal sheets, or the like, the combination of a metal sheet having a nail aperture, a support spaced therefrom, a nail adapted to be driven through said aperture into said support to secure the sheet thereto, a bush insertible through the sheet aperture and slitted at one end for expansion intermediate the sheet and support to brace the former against pounding stresses due to driving the nail home in said support, and a washer and sleeve element on the nail to expand the bush.

In testimony whereof we have signed our names to this specification in the presence of two subscribing witnesses.

JOHN MITCHELL.
JOHN GELL.

Witnesses:
H. D. JAMESON,
O. J. WORTH.